United States Patent [19]

Beausoleil

[11] 3,897,626

[45] Aug. 5, 1975

[54] METHOD OF MANUFACTURING A FULL CAPACITY MONOLITHIC MEMORY UTILIZING DEFECTIVE STORAGE CELLS

[75] Inventor: William F. Beausoleil, Hopewell Junction, N.Y.

[73] Assignee: International Business Machines Corporation, Armonk, N.Y.

[22] Filed: Feb. 20, 1973

[21] Appl. No.: 334,181

Related U.S. Application Data

[62] Division of Ser. No. 156,637, June 25, 1971, Pat. No. 3,735,368.

[30] Foreign Application Priority Data

| | | |
|---|---|---|
| June 26, 1972 | Australia | 43907/72 |
| June 23, 1972 | Belgium | 119120 |
| June 23, 1972 | United Kingdom | 4117/72 |
| June 22, 1972 | Canada | 145385 |
| June 20, 1972 | France | 72.22688 |
| June 23, 1972 | Germany | 2230759 |
| Mar. 24, 1972 | Italy | 22326/72 |
| Apr. 19, 1972 | Japan | 47-38804 |
| June 9, 1972 | Netherlands | 7207823 |
| June 13, 1972 | Switzerland | 8817/72 |
| Apr. 5, 1972 | United Kingdom | 15560/72 |

[52] U.S. Cl. ............... 29/574; 29/577; 340/173 BB

[51] Int. Cl.$^2$ .................. H01L 21/70; H01L 21/98; B01J 17/00

[58] Field of Search ....... 340/172.5, 173 R, 173 BB; 235/153 AK, 153 AM, 153 AC; 29/574; 324/73; 209/81

[56] References Cited

UNITED STATES PATENTS

| | | | |
|---|---|---|---|
| 3,434,116 | 3/1969 | Anacker | 340/172.5 |
| 3,436,734 | 4/1969 | Pomerene | 340/172.5 |
| 3,546,582 | 12/1970 | Barnard | 324/73 |
| 3,588,830 | 6/1971 | Duda | 340/172.5 |
| 3,644,899 | 2/1972 | Boisvert | 340/172.5 |
| 3,654,610 | 4/1972 | Sander | 340/172.5 |
| 3,677,401 | 7/1972 | Chaparro | 209/73 |
| 3,681,757 | 8/1972 | Allen | 340/172.5 |
| 3,715,735 | 2/1973 | Moss | 340/173 |
| 3,750,878 | 8/1973 | Atchley | 209/73 |

*Primary Examiner*—Gareth D. Shaw
*Assistant Examiner*—James D. Thomas
*Attorney, Agent, or Firm*—Edward S. Gershuny

[57] ABSTRACT

A computer memory, most particularly a monolithic memory, may be constructed of components which contain defective bit cells. During the production process, the monolithic chips are sorted into groups in accordance with the chip sector which contains one or more defective cells. The chips are then mounted on memory cards, with all of the chips which have a defect in a given chip sector being mounted on a corresponding card sector. The cards, each of which is produced in a substantially identical manner, are then assembled into a complete memory. The address wiring of the memory is provided in such a manner as to ensure that no given memory word, or defined group of bits within a memory word, contains within it more than one memory cell that is known or suspected to be defective. Means are also provided for deriving from the address of any given memory word the bit location within said word of a defective or suspicious bit. In one embodiment shown herein, the suspect bit is bypassed in favor of a redundant bit provided within the memory system. In another embodiment described herein, the suspect bit is utilized just as if it were a good bit, but, upon detection of an error, the suspect bit will be presumed to be in error.

4 Claims, 11 Drawing Figures

PATENTED AUG 5 1975 3,897,626

SHEET 1

FIG. 4

| C0 | C1 | C2 | C3 | C4 | C5 | C6 | C7 | C8 | C9 | C10 | C11 | C12 | C13 | C14 | C15 |
|---|---|---|---|---|---|---|---|---|---|---|---|---|---|---|---|
| A | $\overline{A}$ | A | $\overline{A}$ | A | $\overline{A}$ | A | $\overline{A}$ | A | $\overline{A}$ | A | $\overline{A}$ | A | $\overline{A}$ | A | $\overline{A}$ |
| B | B | $\overline{B}$ | $\overline{B}$ | B | B | $\overline{B}$ | $\overline{B}$ | B | B | $\overline{B}$ | $\overline{B}$ | B | B | $\overline{B}$ | $\overline{B}$ |
| C | C | C | C | $\overline{C}$ | $\overline{C}$ | $\overline{C}$ | $\overline{C}$ | C | C | C | C | $\overline{C}$ | $\overline{C}$ | $\overline{C}$ | $\overline{C}$ |
| D | D | D | D | D | D | D | D | $\overline{D}$ | $\overline{D}$ | $\overline{D}$ | $\overline{D}$ | $\overline{D}$ | $\overline{D}$ | $\overline{D}$ | $\overline{D}$ |

FIG. 5

| D C B A | | | | | | | | | | | | | | | | |
|---|---|---|---|---|---|---|---|---|---|---|---|---|---|---|---|---|
| 1 1 1 1 | 15 | 14 | 13 | 12 | 11 | 10 | 9 | 8 | 7 | 6 | 5 | 4 | 3 | 2 | 1 | 0 |
| 1 1 1 0 | 14 | 15 | 12 | 13 | 10 | 11 | 8 | 9 | 6 | 7 | 4 | 5 | 2 | 3 | 0 | 1 |
| 1 1 0 1 | 13 | 12 | 15 | 14 | 9 | 8 | 11 | 10 | 5 | 4 | 7 | 6 | 1 | 0 | 3 | 2 |
| 1 1 0 0 | 12 | 13 | 14 | 15 | 8 | 9 | 10 | 11 | 4 | 5 | 6 | 7 | 0 | 1 | 2 | 3 |
| 1 0 1 1 | 11 | 10 | 9 | 8 | 15 | 14 | 13 | 12 | 3 | 2 | 1 | 0 | 7 | 6 | 5 | 4 |
| 1 0 1 0 | 10 | 11 | 8 | 9 | 14 | 15 | 12 | 13 | 2 | 3 | 0 | 1 | 6 | 7 | 4 | 5 |
| 1 0 0 1 | 9 | 8 | 11 | 10 | 13 | 12 | 15 | 14 | 1 | 0 | 3 | 2 | 5 | 4 | 7 | 6 |
| 1 0 0 0 | 8 | 9 | 10 | 11 | 12 | 13 | 14 | 15 | 0 | 1 | 2 | 3 | 4 | 5 | 6 | 7 |
| 0 1 1 1 | 7 | 6 | 5 | 4 | 3 | 2 | 1 | 0 | 15 | 14 | 13 | 12 | 11 | 10 | 9 | 8 |
| 0 1 1 0 | 6 | 7 | 4 | 5 | 2 | 3 | 0 | 1 | 14 | 15 | 12 | 13 | 10 | 11 | 8 | 9 |
| 0 1 0 1 | 5 | 4 | 7 | 6 | 1 | 0 | 3 | 2 | 13 | 12 | 15 | 14 | 9 | 8 | 11 | 10 |
| 0 1 0 0 | 4 | 5 | 6 | 7 | 0 | 1 | 2 | 3 | 12 | 13 | 14 | 15 | 8 | 9 | 10 | 11 |
| 0 0 1 1 | 3 | 2 | 1 | 0 | 7 | 6 | 5 | 4 | 11 | 10 | 9 | 8 | 15 | 14 | 13 | 12 |
| 0 0 1 0 | 2 | 3 | 0 | 1 | 6 | 7 | 4 | 5 | 10 | 11 | 8 | 9 | 14 | 15 | 12 | 13 |
| 0 0 0 1 | 1 | 0 | 3 | 2 | 5 | 4 | 7 | 6 | 9 | 8 | 11 | 10 | 13 | 12 | 15 | 14 |
| 0 0 0 0 | 0 | 1 | 2 | 3 | 4 | 5 | 6 | 7 | 8 | 9 | 10 | 11 | 12 | 13 | 14 | 15 |
| | C0 | C1 | C2 | C3 | C4 | C5 | C6 | C7 | C8 | C9 | C10 | C11 | C12 | C13 | C14 | C15 |

CHIP-SECTOR ADDRESS

METHOD OF MANUFACTURING A FULL CAPACITY MONOLITHIC MEMORY UTILIZING DEFECTIVE STORAGE CELLS

RELATED APPLICATION

This application is a division of copending application Ser. No. 156,637 filed June 25, 1971 for FULL CAPACITY MONOLITHIC MEMORY UTILIZING DEFECTIVE STORAGE CELLS, now U.S. Pat. No. 3,735,368 . FIG. 10 and the SUMMARY added herein merely summarize material appearing elsewhere in this specification and contain no new matter.

BACKGROUND OF THE INVENTION

This invention relates to data processing system storages and more particularly to a method for manufacturing a monolithic memory utilizing defective memory components that normally would be rejected in production.

In monolithic memories, a number of storage cells are formed on a single silicon wafer. The wafers are cut into a number of smaller units called chips. These chips are arranged on substrates and the substrates are packaged on integrated circuit modules. The integrated circuit modules are soldered into printed circuit cards to make up a basic component of a memory. In the production of monolithic chips, the yield of good chips from the silicon wafer may be low, especially in the first few years of production. For each perfect chip produced, there may be a number of chips that are almost perfect, having localized imperfections which render unusable only a single cell or a few closely associated cells. In U.S. Pat. application Ser. No. 76917 filed on Sept. 30, 1970 for W. F. Beausoleil there is described a method and apparatus in which defective chips are sorted during the production process, and chips having defective areas in similar locations are arranged in the same pattern in each array card. Logic is provided between the memory address register and the array card which translates each address to avoid the addressing of defective cells. In another Beausoleil application, Ser. No. 38220 filed May 18, 1970, an easily reconfigurable system is described. In that system, when a word is found to contain a number of errors which exceeds the correcting capability of the error correcting system, the memory may be readily reconfigured so that the bad bits are distributed more randomly throughout the memory, enabling the error connection circuitry to cope with the errors.

Each of the patent applications U.S. Pat. Nos. 38,220 and 76,917 referred to above is incorporated into this application by said reference. Also incorporated herein is application Ser. No. 156,637 from which the invention claimed herein was divided.

OBJECTS OF THE INVENTION

It is a general object of this invention to provide an improved process for the manufacture of monolithic memories.

It is a more particular object of this invention to provide a process for manufacturing a monolithic memory which utilizes partially defective components and which utilizes all addressable memory locations.

Another object is to accomplish the above while manufacturing a memory which is made up of a minimal number of field replaceable parts and which utilizes a minimal number of different manufacturing parts.

Yet another object of the invention is to provide a process for manufacture of monolithic memories which will require the least amount of redesign in presently existing processes.

Another object is to manufacture a memory wherein a given word contains, within a predefined group of bits, only one suspect bit and the word address will identify the suspect bit.

SUMMARY OF THE INVENTION

Briefly, the invention comprises a method of manufacture in which defective chips are sorted during the production process, and chips having defective areas in similar sections are all put in a corresponding section of an array card. Means are provided for identifying, for each word, by operating upon the word address, the bit which was read from (or written into) a defective chip section. In the preferred embodiments of the invention, part of the above is accomplished through an arrangement of "back-panel wiring" which ensures that no word will contain more than one bit from a defective chip section.

In a first embodiment of a memory produced by the invention, reading and writing of the defective chip section will be performed just as if those sections were perfect. Upon detection of an error that is not otherwise correctable, the bit which came from a defective chip section will be inverted and, if the error detection circuitry indicates that the data is now valid (or that the word now contains a correctable error) processing will continue. This first embodiment has the advantage that it is the least expensive implementation of the invention. The memory contains no extra redundancy (thereby reducing production costs) and all array cards are identical (thereby reducing manufacturing part number and inventory costs). It has the disadvantage that it does, to some small extent, reduce the error detection and/or correction capability of the memory system.

In a second embodiment of a memory produced by the invention, one or more redundant array cards are provided. In this case, a bit from a defective section of a chip will be bypassed in favor of a bit on one of the redundant cards. In the preferred version of this second embodiment, the redundant array cards are all populated exclusively by perfect chips. This second embodiment will generally be more expensive than the first embodiment. It contains redundant memory locations (thus increasing production costs) and preferably contains only perfect chips on the redundant cards (thus possibly increasing the cost of maintaining a parts inventory). However, it does have the advantage that there is no degradation in the system's error detection and/or correction capability. Also, it must be noted that even the second embodiment will generally be less expensive, in terms of both production costs and inventory costs, than known practical prior art systems.

The foregoing and other objects, features and advantages of the invention will be apparent from the following more particular description of preferred embodiments of the invention, as illustrated in the accompanying drawings.

DESCRIPTION OF THE DRAWINGS

FIG. 4 shows back-panel wiring in accordance with the invention;

FIG. 5 shows the logical effect of the altered back-panel wiring on chip sector addresses;

DETAILED DESCRIPTION

Environment of the Invention

Figure 1:
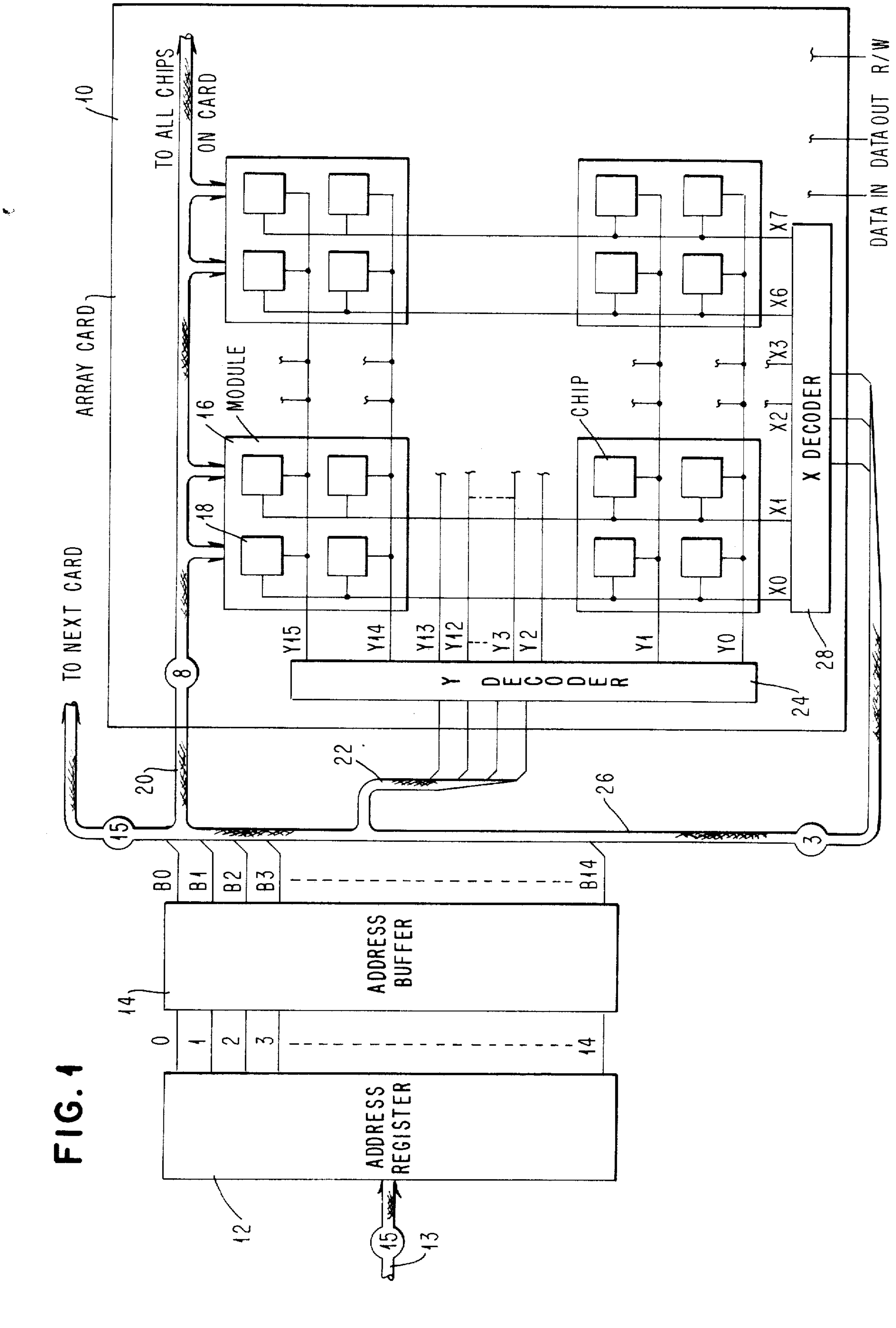
FIG. 1 is a block schematic diagram of a monolithic memory which may be manufactured in accordance with the invention.

Referring to FIG. 1, a monolithic memory which may be constructed in accordance with the invention is shown. The memory is comprised of a plurality of array cards 10, each card representing one bit position of a word in a three dimensional memory. Only one array card is shown although a number of such cards is necessary depending on how many bit positions are in a full word. The memory is addressed by means of an address received in address register 12, from address bus 13, which address is re-powered by address buffer 14.

Each array card 10 is comprised of a plurality of modules 16. Each module is comprised of four chips. (A single chip is shown in more detail in FIG. 2.) The bit addresses on a chip are arbitrarily divided into logical sectors and the binary address bits which address these sectors are called the sector address.

The output 20 from the address buffer 14 is connected to all chips throughout the memory and is decoded to select a single bit cell on a chip, as is more fully described with reference to FIG. 2.

The output 22 of the address buffer 14 drives a Y decoder 24 and the output 26 from the address buffer drives an X decoder 28 on the array card. The decoded outputs of the Y decoder and the X decoder energize a single chip of the intersection of the energized outputs.

Figure 2:
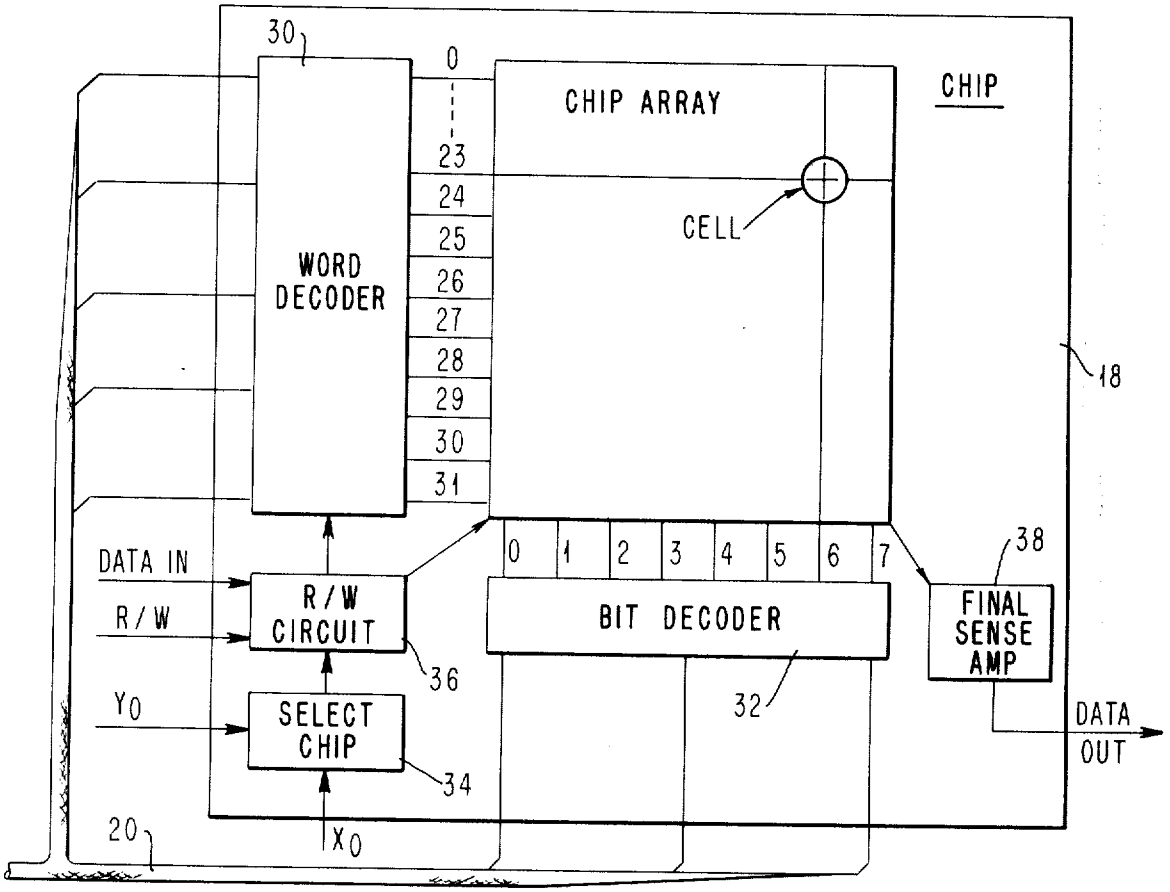
FIG. 2 is a more detailed block diagram of one chip of the memory of FIG. 1.

Referring to FIG. 2, a single chip is shown in more detail. The word decoder 30 and the bit decoder 32 decode the output 20 from the address buffer which results in the selection of a single bit from the chip at the intersection of the energized decoder output lines.

Each chip is also provided with select chip circuitry 34 responsive to the X and Y coordinate lines. When the appropriate X and Y lines are energized, the select chip logic 34 activates the read/write (R/W) circuit 36. When the R/W input of the R/W circuit is energized, the data on "Data In" line is stored in the selected memory cell in the chip array. Only that cell which is selected by the word decoder and the bit decoder is activated for storage.

Similarly, data are sensed by the final sense amplifier 38 which is connected to the array in such a manner that it responds to read data from the cell which is energized by the word decoder and the bit decoder.

The details of the chip array, decoders, write circuitry, and read circuits vary from memory-to-memory and therefore, have not been shown in detail. A typical memory in which the invention may be embodied is shown in an article entitled "A High-Performance LSI Memory System" by Richard W. Bryant et al on pages 71–77 in the July 1970 issue of Computer Design.

At this point, primarily in order to introduce terminology which will be used in the following detailed description of a memory constructed in accordance with the invention, some additional details of the memory arrangement and the manner in which it is addressed will be described. The preferred embodiment of this memory contains a plurality of words, each of which contains 16 bits of information. In the preferred embodiment, each bit in a word is supplied by a different card, so a basic operational memory (BOM) will contain 16 array cards. Each card contains 128 array chips (32 modules), and each chip contains 256 bit cells. With 128 chips per card and 256 bits per chip, this memory will have a capacity of 32, 768 words. With 16 bits per word, the BOM will contain over half a million bits. Of course, as is well-known, several BOM's may be joined together to form a larger memory. In order to address a memory of this size, fifteen address bits are required. Seven of the address bits will specify one of the chips on a card and the remaining eight address bits will specify a cell within the chip. The fifteen address bits are normally used in parallel to simultaneously address a single cell on each of the sixteen cards. These 16 cells form a word.

The 15 address bits can be broken down still further. The card can be regarded as being divided into 16 logical sectors, each sector containing eight chips. In this case, the four of the seven chip-address bits will define a card sector and the remaining three bits of the chip-address will select a specific chip within the sector. If we also regard each chip as being logically divided into sixteen sectors, then four of the eight cell-address bits will indicate a specific chip sector and the remaining four cell-address bits will indicate a specific memory cell within the sector. In the following sections of this specification, the four bits which define a chip sector will be called A,B,C and D, where D is regarded as being the high-order bit of the chip-sector-address. The four bits which define a card-sector address will be referred to as E,F,G and H is regarded as the high-order bit of the card-sector address. Preferably, each module is comprised of four chips which are logically part of four contiguous card sectors.

Figure 3:
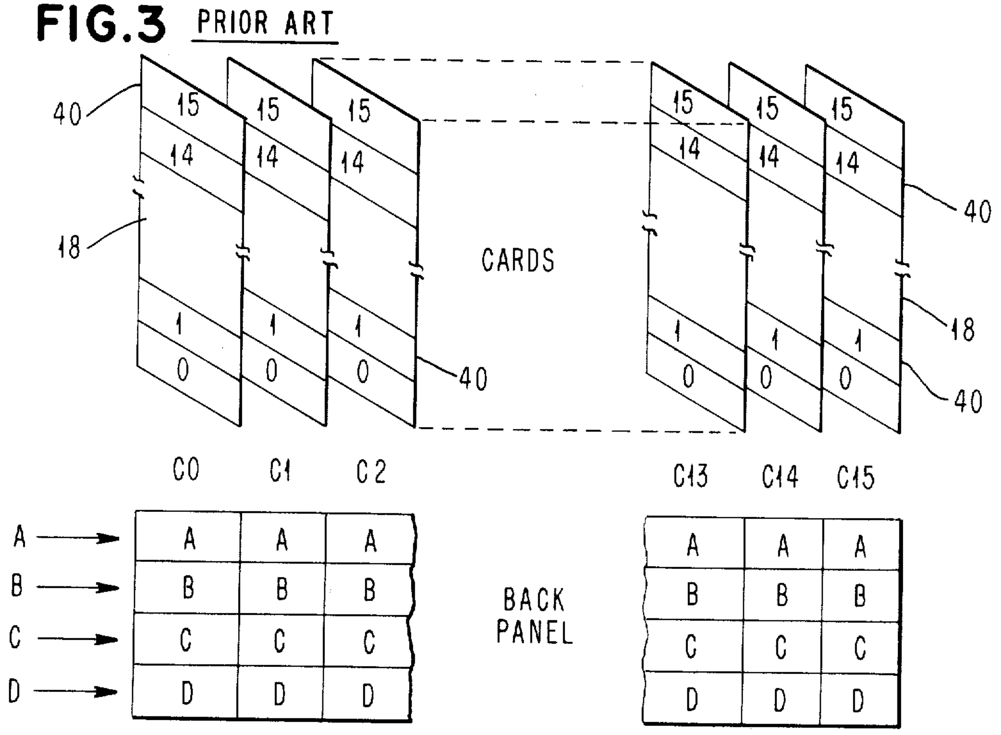
FIG. 3 PRIOR ART
FIG. 3 shows a prior art arrangement of array cards and back-panel wiring.

Referring now to FIG. 3, some additional details of a small portion of a prior art memory are shown. The top portion of FIG. 3 represents sixteen array chips 18 each of which forms a part of one of the array cards C0, C1, C2, . . . C13, C14, C15. When a word in the memory is addressed, each of these chips will supply one bit of that word. Each chip is logically divided into 16 chip sectors 40, each chip sector containing 16 bit cells. As was described above, word address bits DCBA will designate one of the sixteen chip sectors, and four other address bits will designate a specific bit cell within the sector. The bottom portion of FIG. 3 indicates a portion of the standard back-panel wiring which is used to distribute addresses to each of the cards in the BOM. This portion of the figure is intended to show that the incoming chip-sector address bits DCBA are distributed unchanged to all of the cards. In general, this will be true of all of the address bits, and all of the bit cells that are addressed on the sixteen cards will be substantially in physical alignment with each other.

THE INVENTION

As has been stated abive, this invention provides a manufacturing method which enables construction of a reliable memory from partially defective components. When the array chips are tested after manufacture, they are sorted into three major groups: (1) perfect chips; (2) chips having one or more defects in one and only one of the 16 sectors (hereinafter referred to as "imperfect chips"); and (3) chips having at least one defect in two or more of the 16 sectors. In this invention, both perfect and imperfect chips are utilized. The imperfect chips are further sorted into sixteen groups, each group containing chips having imperfections in a common sector. In using the imperfect chips to construct an array card, in accordance with the preferred embodiments of the invention, chips having imperfections in sector 0 are used only on sector 0 of the card, chips having imperfections in sector 1 are used only in sector 1 of the card, etc. The perfect chips may be used anywhere on the card. Thus, depending upon production yields, each logical sector of an array card may have upon it one or more chips having one or more imperfections localized within a chip sector which corresponds to the card sector. These array cards will be utilized, as described below, in constructing a BOM.

With reasonable production yields, a sizeable percentage of chips will be perfect. Perfect chips, of course, may be used anywhere on a card. An imperfect chip will often have only one, or a small number, of defective storage cells. When addressing, for example chip-sector 0 on card-sector 0, there will be a probability (which depends upon production yields) that a perfect chip-sector is being addressed. And, even if an imperfect chip-sector is being addressed, there will be some probability that the specific memory cell being addressed is perfect. This latter probability will generally increase as chip-sector size increases. Because there is a fairly high probability that a storage cell contained in chip-sector n of card-sector n is a perfect storage cell, that cell will often be referred to herein as a "suspect" cell which contains a "suspect" bit of data. It will also be recognized that an imperfect cell is merely a cell which has failed to pass one or more quality control tests. Because of the strictness of these tests, such a cell may well function perfectly when used in a memory. Those skilled in the art will also recognize that certain chip defects (e.g., in a line or a sense amplifier) may render a perfect cell inaccessible. For purposes of this description, inaccessible cells will be regarded as being imperfect cells.

In assembling chips onto modules and placing the modules on a card, it is preferred that each module contain four chips and that the four chips be part of four logically contiguous card sectors. A module which contains chips that may have defects in chip-sectors 0, 1, 2 or 3 will be used as part of card-sectors 0, 1, 2 and 3, respectively; a module which contains chips that may have defects in chip-sectors 4, 5, 6 or 7 will be used as part of card-sectors 4, 5, 6 and 7, respectively; etc. Using this arrangement, a card may be constructed of four different types of modules thus minimizing the amount of different part numbers which are used in the manufacturing process.

Another step in the manufacture of this memory is to "skew" that portion of the back-panel address wiring which relates to the chip-sector address bits DCBA. The manner in which the back-panel wiring is skewed for each of the sixteen cards is indicated in FIG. 4. Each of the columns in FIG. 4 shows the skewing of a chip-sector address that is sent to one of the cards. The letters DCBA represent the four chip-sector address bits. The notations $\bar{A}$, $\bar{B}$, $\bar{C}$ and $\bar{D}$ are intended to mean the inverse of bit A, the inverse of bit B, the inverse of bit C and the inverse of bit D, respectively. FIG. 4 is intended to show that, when chip-sector address bits are transmitted to the cards, card 0 (C0) receives these bits unchanged, C1 receives the chip-sector address bits with bit A inverted, C2 receives the bits with bit B inverted, C3 receives the bits with bits A and B inverted, . . . C15 receives the bits with all bits inverted. Although it will be noted that the skewing arrangement shown in FIG. 4 follows a binary sequence, this need not be the case. Any skewing arrangement which presents a different combination of inverted and uninverted bits to each card may be utilized. However, some kind of sequential skewing will usually be preferred because this will simplify the circuitry which identifies a suspect bit.

In order to appreciate the significance of this skewing, one must first recall that this memory is constructed in such a manner that each chip located in a given card sector may contain an imperfection in a corresponding chip sector. For this reason, if conventional non-skewed addressing were to be used, it would be possible to address a word (for example, a word contained within chip sector 7 of card sector 7) which could contain several (or all) imperfect bit cells. However, with the skewing, each bit that is read from (or written into) the memory comes from a different chip sector. With back-panel wiring as depicted in FIG. 4, when bits DCBA reference chip sector 7, only card 0 (C0) will actually furnish a bit from sector 7 of a chip: C1, because of the inversion of bit A, will furnish a bit from sector 6 of a chip; C2, because of the inversion of bit B, will furnish a bit from sector 5 of a chip; . . . C15, because of the inversion of all bits, will furnish a bit from sector 8 of a chip. The skewed wiring thus ensures that any word which is accessed from the memory will contain no more than one suspect bit.

In order to provide a further appreciation for the effect of the skewing of the chip-sector addresses, reference is now made to FIG. 5. FIG. 5 is associated with FIG. 4 in the same manner that the top and bottom portions of FIG. 3 were associated. Each of the columns of FIG. 5 represents one array chip. Although the chips are not shown in perspective (as are the chips in the top portion of FIG. 3), it will be recognized that these chips generally form a stack within the memory. Each chip is divided into sixteen logical sectors, numbered 0–15. Along the left-hand side of the drawing, are shown the 16 possible configurations of the chip-sector address bits DCBA. The entries within FIG. 5 may be regarded as a translation table, or truth table, which shows exactly how the skewed wiring depicted in FIG. 4 will distribute chip-sector addresses to the various cards. For example, a reference to chip sector 10 (DCBA is 1010) will cause a bit to be selected from sector 10 of a chip on card 0 (C0), a bit to be selected from sector 11 of a chip on C1, a bit to be selected from sector 8 of a chip of C2, etc. Again, the significant point is that, no matter what chip-sector address is received into the address register, each card will supply a bit from a different chip sector.

A memory constructed in accordance with the above, wherein each word may contain a reference to an imperfect bit cell, may still be reliable because each word address uniquely identifies the imperfect bit. In accordance with the preferred embodiments of the invention, this identification is accomplished in one simple step by Exclusive-Oring the chip-sector address bits DCBA which were received from the address bus with the card-sector address bits HGFE also received from the address bus. The result of the Exclusive-Or operation will be the location within the word of the bit which was read from (or written into) a suspect cell.

FIG. 5, besides being illustrative of a portion of this memory, can be regarded as a truth table with illustrates the above-described Exclusive-OR operation. When using FIG. 5 as a truth table, the configurations for chip-sector address bits DCBA shown on the left-hand side retain the meaning previously ascribed to them. However, the designations C0 through C15 appearing at the bottom of the columns of FIG. 5 must now be interpreted as representing the card-sector address bits HGFE. Although these address bits are represented in FIG. 5 as decimal digits, the equivalent binary representation is well-known and need not be described herein. As an example, assume that the address received from the address bus indicates a reference to card sector 12 (HGFE is 1100) and a reference to chip-sector 7 (DCBA is 0111). Column C12 and line 0111 of FIG. 5 intersect at a box containing the number "11" (1011 in binary). The binary number 1011 is the Exclusive-OR of the binary numbers 1100 and 0111 and therefore tells us that, for this particular word, bit 11 came from an imperfect chip sector. In order to verify the correctness of this result, one may again refer to FIG. 5, this time interpreting the designations C0 through C15 as they were originally presented: that is, as referring to cards 0–15. Since, for this example, the the chip-sector address was given as 0111, we must look at that row of FIG. 5. The result of the Exclusive-OR operation told us that bit 11 was the imperfect bit (and we know that this memory normally operates in such a manner that bit 11 would be derived from card 11) we must locate the intersection between row 0111 and column C11. The number "12" is found at this intersection. The number 12 tells us that, for the word in question, bit 11 (from card 11) was accessed from sector 12 of a chip on card 11. Since this example stated that the word was addressed from cardsector 12, and because this memory was built in such a manner that chips with imperfections in chip-sector 12 were always placed on card-sector 12, the fact that bit 11 of the exemplary word was drawn from chip-sector 12 of a chip of card-sector 12 establishes the correctness of the Exclusive-OR technique of identifying the imperfect bit.

Substantially all of the preceding description is applicable to both of the memory embodiments described herein. The remainder of the description of each embodiment is separately treated below.

LEAST COST SYSTEM

Figure 6:
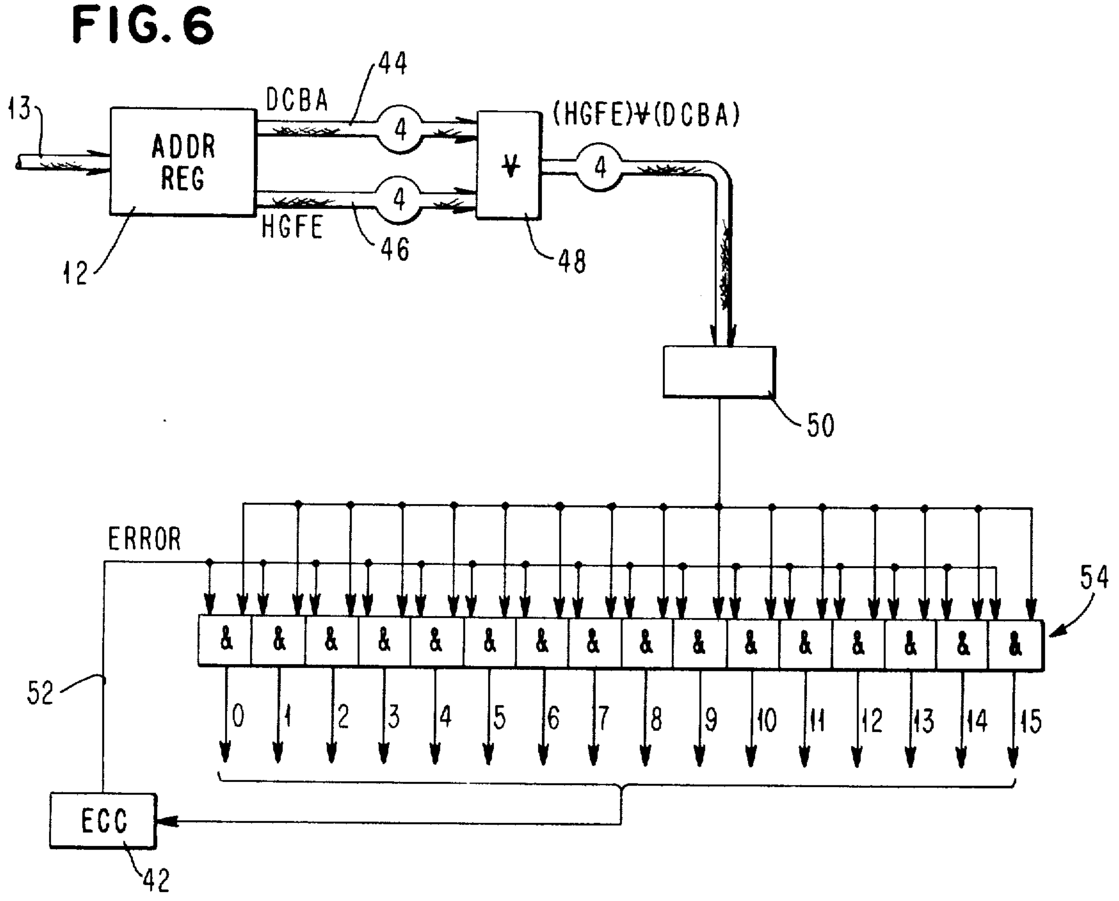
FIG. 6 shows circuitry used in implementing a first embodiment of a memory constructed in accordance with the invention.

FIG. 6 shows additional elements that are added to a memory system built in accordance with a preferred simple, economical implementation of this invention. As was described above, under the heading Environment of the Invention, the memory system includes an address bus 13 which feeds the address register 12. It is further assumed that the memory system contains some form of error detection circuitry 42. Implementation of this invention will normally require minor modifications to the existing error detection circuits. The address register 12 feeds chip-sector address bits DCBA via line 44 and card-sector address bits HGFE via line 46 to an Exclusive-OR circuit 48, the output of which is fed to a register 50 for retention in the event that error correction becomes necessary. Upon detection of an error in data in the memory data register (not shown) the error detecting circuitry 42 will generate a signal on error line 52 which signal is fed to each of a group of 16 AND circuits 54. Each of the AND circuits 54 has inputs connected to the output of register 50 and each AND circuit is so designed as to produce an output signal when it senses the concurrence of an error signal and an output from register 50 having a binary value corresponding to the position of the particular AND circuit within the group of sixteen. The output signal generated by one of the AND circuits 54 is transmitted to the error correcting circuitry 42 so that it may be utilized to invert the bit identified thereby.

Various techniques for implementing error correction circuitry that will accomplish the function of inverting a specifically identified bit are well-known. One example of such circuitry is shown in the Sakalay U.S. Pat. No. 3,245,049 issued Apr. 5, 1966 which is hereby incorporated by reference into this specification.

Although the various kinds of error correction circuitry which may be used to advantage in the embodiment of FIG. 6 are too well-known to require detailed description herein, the type of error detection and/or correction circuitry utilized will have a significant effect upon the advantages which may be realized by the use of this embodiment of the invention. For example, if the memory system contains only parity circuits, then this embodiment of the invention will, upon indication of a parity error, always invert the bit identified by the contents of register 50 and then continue processing under the assumption that the data is now correct. If the parity failure had been caused by an error in some other bit position, the "correction" would actually introduce a second error. Although this apparent disadvantage may not be of great significance because of the high reliability of the perfect portions of the monolithic memory, this embodiment will preferably be used in a memory system wherein the error detection circuitry is of a type which can correct any single error occurring in a data word and can detect any two errors which occur in a single data word. In such a system, it will generally be preferable to allow the error correction circuitry 42 to correct, on its own, any single errors which might occur. In the event that the error detection circuitry 42 were to detect the occurrence of a double error, it would then produce a signal on error line 52 which, in conjunction with the contents of register 50 would enable one of the AND circuits 54 to generate a signal indicating the location of the imperfect bit. The error correction circuitry 42 would then invert this imperfect bit and again examine the data word to see if the presence of a single (correctable) error were indicated. If such were the case, the error correcting circuitry 42 would correct the single error in its normal manner and processing would continue. With the use of single-error-correction double-error-detection circuitry there will be only an extremely remote possibility that this embodiment of the invention might permit erroneous data to pass undetected or improperly corrected. Again, details of specific implementations of such circuitry are well-known and do not require further description herein.

It is worth noting that, in this first preferred embodiment, no delay or impediment to the normal operation of the computer will be introduced unless an error occurs. It should also be noted that, despite the use of imperfect chips, the majority of words in the memory will contain no errors.

FASTEST MOST RELIABLE EMBODIMENT

In accordance with a second preferred embodiment, a memory may be implemented in such a manner that the performance of the memory system suffers no degradation in speed or reliability. Briefly, this embodiment comprises an additional array card, preferably manufactured entirely from perfect chips. When writing into the memory, a data bit that would normally be written into a cell in a chip sector that has been denoted as being imperfect will be written into a bit cell on the perfect array card. When reading from the memory, this bit from the perfect array card will be gated to the appropriate location in the memory data register in place of the bit which would have been read from an imperfect chip sector.

Figure 7A:
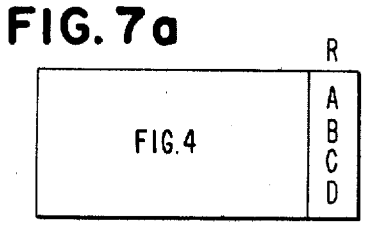
FIGS. 7*a* and 7*b* show back-panel wiring and card array changes utilized in a second embodiment of the invention.

FIG. 7 shows the modifications that are made to FIGS. 4 and 5 in implementing this second embodiment. As is shown in FIG. 7*a*, additional back-panel wiring is required to provide addresses to the redundant card. As before, only the back-panel wiring for chip-sector address bits DCBA is shown. (The remainder of the back-panel address wiring is completely straightforward and need not be described herein.) Although FIG. 7*a* shows this wiring to be unskewed, any convenient skewing may be utilized if desired.

Figure 7B:
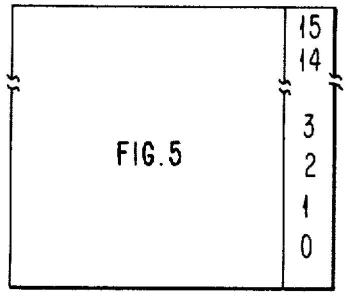

As shown in FIG. 7*b*, each chip-sector on the redundant card will be addressed without any skewing by the back-panel wiring depicted in FIG. 7*a*.

This second embodiment is similar to the first embodiment (see FIG. 6) to the extent that it also requires an Exclusive-OR circuit 48 which is fed by a bus 44 carrying the card-sector address bit HGFE, and some means 50 for retaining an indication of the output of Exclusive-OR circuit 48.

Figure 8:
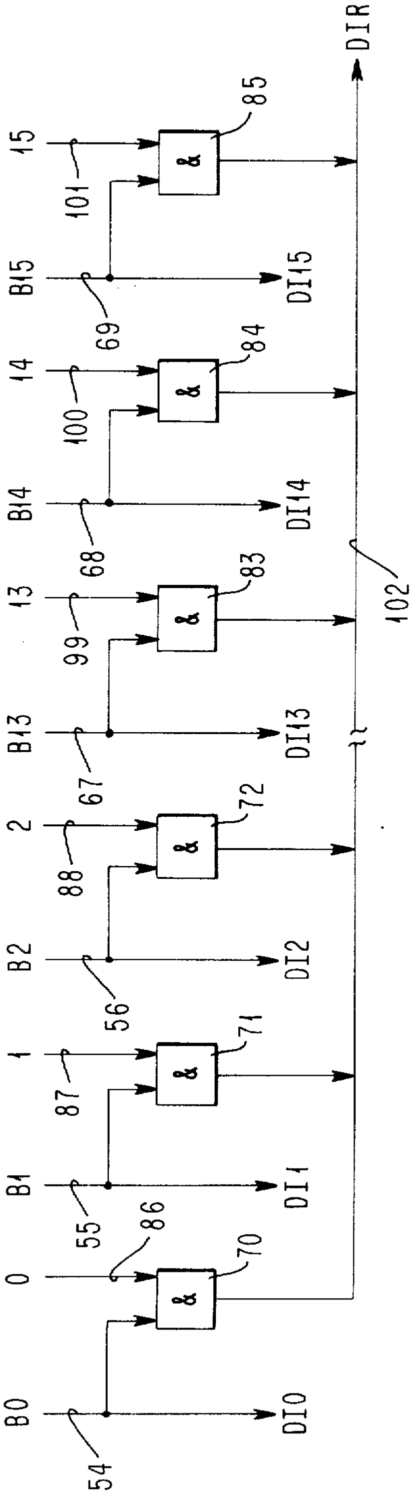
FIG. 8 shows additional memory write circuitry used in the second embodiment.

Referring now to FIG. 8, the few additions to the memory system that are used when writing into the memory in accordance with this embodiment are shown. The sixteen data bits B0-B15 are received on lines 54–69 and are directed to Data In lines DI0-DI15 on each card as has been previously described with respect to FIG. 2. Each data bit input line also serves as one input to an associated AND circuit. For the sixteen data bit input lines, there are sixteen associated AND circuits 70–85. Each of the AND circuits 70–85 receives its additional inputs via lines 86–101 from register 50 (FIG. 6) in exactly the same manner as did the AND circuits 54 shown in FIG. 6. The outputs of all of the AND circuits 70–85 are OR'ed together on line 102 which feeds the Data In line DIR of the redundant card. Thus, the identification contained within register 50 (FIG. 6) of the utilization of an imperfect chip-sector will cause one of the lines 86–101 to enable one of the AND circuits 70–85 to write the data bit which was directed to an imperfect chip sector into a cell on the redundant card. There is no need to inhibit the attempt, via one of the Data In lines DI0-DI15, to write into the imperfect chip-sector.

Figure 9:
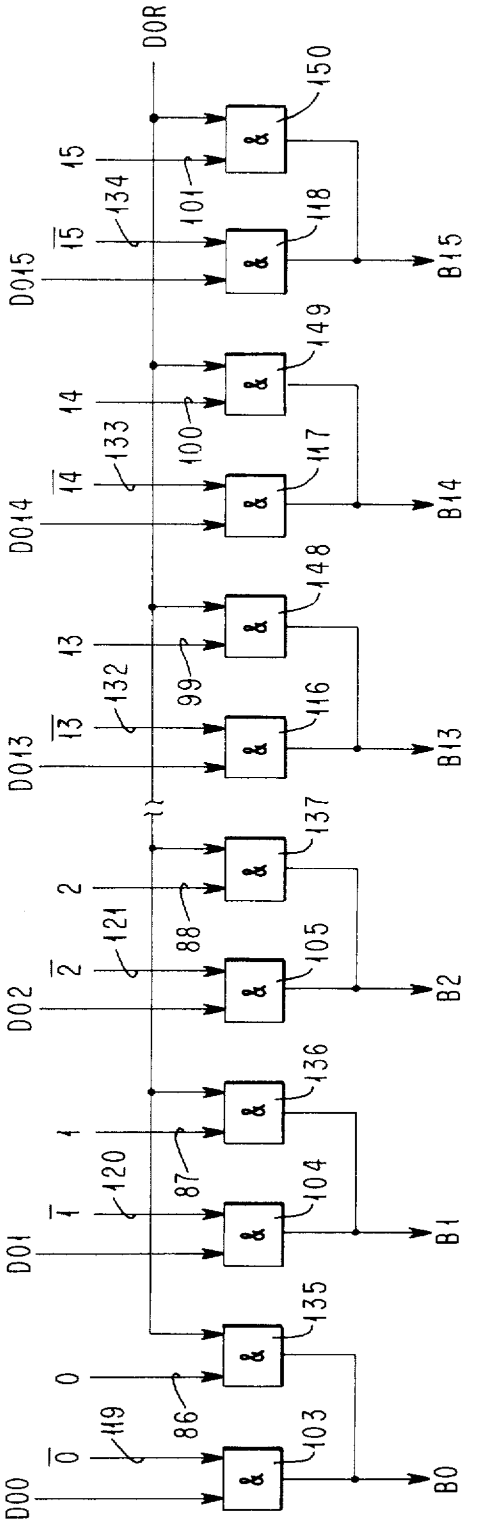
FIG. 9 shows additional memory read circuitry used in the second embodiment.

As is shown in FIG. 9, readout from the memory is accomplished in a similar manner. When reading, a bit is received from each card via the Data Out lines DO0-DO15 and a data bit is received from the redundant card via its Data Out line DOR. Each of the sixteen Data Out lines DO0-DO15 supplies one input to an associated AND circuit 103–118. Additional inputs to each of the AND circuits 103–118 are supplies via lines 119–134, the signals on said lines being derived from the register 50 (FIG. 6) which indicates the location of the bit which is being read from an imperfect chip-sector. Line 119 will enable AND 103 when bit position 0 does not contain the imperfect bit, line 120 will enable AND 104 when bit position 1 does not contain the imperfect bit, line 121 will enable AND 105 when bit position 2 does not contain the imperfect bit . . . , line 132 will enable AND 116 when bit position 13 does not contain the imperfect bit, line 133 will enable AND 117 when bit position 14 does not contain the imperfect bit, and line 134 will enable AND 118 when bit position 15 does not contain the imperfect bit. Finally, the Data Out line DOR from the redundant card furnishes one input to each of sixteen AND circuits 135-150. Each of the AND circuits 135–150 receives additional inputs via lines 86–101 from register 50 (FIG. 6). The binary number contained within register 50 will cause one of the lines 86–101 to enable its associated AND circuit, thereby causing the data bit read from the redundant array card on Data Out line DOR to pass via one of the bit output lines B0-B15 to the proper location in the memory data register (not shown) in place of the bit being read from an imperfect chip-sector.

Because of each word that is written into or read from the memory in this second embodiment utilizes sixteen perfect bit cells, it can introduce no degradation of the reliability of the memory system. So far as any error detection and/or correction circuitry that may exist in the system is concerned, the system will function exactly as would a memory constructed entirely of perfect chips and which did not contain this invention. Although this embodiment of the invention introduces additional levels of logic, primarily when reading data from the memory (as shown in FIG. 9, a first level comprises AND circuits 103–118 and 135–150, and a second level comprises the OR'ing of the outputs of AND pairs 103 and 135, 104 and 136, etc.), these generally will not have a significant effect upon the memory speed because (1) of the parallelism of the memory system and (2) this circuitry may be imbedded within (i.e., shared by) the ECC already in the memory system.

Although this second embodiment is more expensive to produce (an extra card is required) its increased reliability will make it the preferred choice in many applications.

In both of the preferred embodiments described above, the number of groups into which imperfect chips were sorted was selected as being equal to the number of bits in a word. Brief descriptions are presented in previously referenced application Ser. No. 156,637 of other alternative embodiments including two wherein the number of sorted groups of imperfect chips is not equal to the number of bits in a word.

SUMMARY

Figure 10:
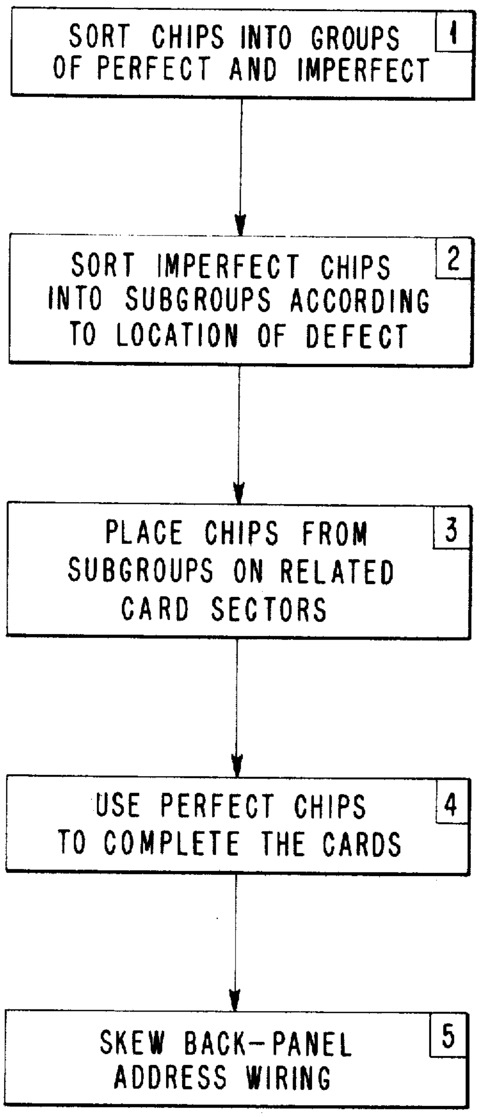
FIG. 10 is a general flow diagram showing various steps of the method of manufacture.

The steps which comprise a method of manufacturing a monolithic memory in accordance with this invention are summarized in FIG. 10. After the array chips have been manufactured, they are tested and sorted into a group of perfect chips and a group of imperfect chips (block 1, FIG. 10). From the imperfect chips, a further sort is utilized to obtain a number of sub-groups each of which contains chips having all of their defects localized within a single common chip-sector (block 2). In manufacturing array cards from the chips, chips in the sub-groups are preferably utilized first. Chips which contain defects within a given chip-sector will be located on a related card-sector (block 3). In the preferred embodiment of the invention, chips which contain defects within an $i^{th}$ chip-sector will be located on the $i^{th}$ card-sector. Any cards that are not completely populated by imperfect chips will be completed with perfect chips (block 4). Also, depending upon the specific memory implementation utilized, one or more cards or card-sectors may be made up entirely of perfect chips. In the finally assembled memory, portions of the address wiring are skewed (block 5) as has previously been described in detail.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a method of manufacturing a monolithic memory of the type which is constructed of chips containing a plurality of addressable memory cells, said method utilizing imperfect chips, the steps of:

sorting from said chips a first group of perfect chips and a second group of imperfect chips;

sorting from said second group a number of subgroups each consisting of chips having imperfections localized within one known logical chip-sector;

arranging in said memory at least one chip from at least one of said subgroups in such a manner that the address of the location within said memory of said one chip bears a known relation to the location on the chip of the imperfect chip-sector of said one chip; and wiring said memory in such a manner that, when a word is addressed which contains a bit of data to be read from a memory cell in the imperfect sector of said one of said chips, the address of said word may be decoded to indicate which bit in said word is read from said imperfect chip-sector.

2. In a method of manufacturing a monolithic memory of the type which is constructed of array cards each of which contains logical sectors containing chips containing a plurality of addressable memory cells, said method utilizing imperfect chips, the steps of:

sorting from said chips a first group of perfect chips and a second group of imperfect chips;

sorting from said second group a number of subgroups each consisting of chips having imperfections localized within the same logical chip-sector;

arranging chips having imperfections within their $i^{th}$ chip-sector on the $i^{th}$ card-sector of said cards; and skewing the address wiring of said memory in such a manner that no two memory cells both of which store data bits related to the same predefined portion of a memory word will have both the same chip-sector-address and the same card-sector address.

3. The method of claim 2 wherein the chip-sector-address wiring of said memory is skewed in such a manner that no two memory cells both of which store data bits related to the same predefined portion of a memory word will have the same chip-sector-address.

4. In a method of manufacturing a monolithic memory of the type which is constructed of chips containing a plurality of addressable memory cells, said method utilizing imperfect chips, the steps of:

sorting from said chips a first group of perfect chips and a second group of imperfect chips;

sorting from said second group a number of subgroups each consisting of chips having imperfections localized within the same known logical chip-sector;

arranging in said memory at least one chip from at least one of said subgroups in such a manner that the address of the location within said memory of said one chip bears a known relation to the location on the chip of the imperfect chip-sector of said one chip; and wiring said memory in such a manner that each word that is read from said memory will contain, in a predefined portion of said word, no more than one bit which has been read from a chip-sector that is known to be imperfect.

* * * * *